US012800508B2

(12) United States Patent
Berg et al.

(10) Patent No.: US 12,800,508 B2
(45) Date of Patent: Nov. 17, 2026

(54) TEST STRIP FIXATION DEVICE FOR OPTICAL MEASUREMENTS OF AN ANALYTE

(71) Applicant: Roche Diabetes Care, Inc., Indianapolis, IN (US)

(72) Inventors: Max Berg, Mannheim (DE); Fredrik Hailer, Limburgerhof (DE); Bernhard Limburg, Soergenloch (DE); Christian Melchinger, Mannheim (DE)

(73) Assignee: Roche Diabetes Care, Inc., Indianapolis, IN (US)

( * ) Notice: Subject to any disclaimer, the term of this patent is extended or adjusted under 35 U.S.C. 154(b) by 686 days.

(21) Appl. No.: 18/166,942

(22) Filed: Feb. 9, 2023

(65) Prior Publication Data

US 2023/0184689 A1 Jun. 15, 2023

Related U.S. Application Data

(63) Continuation of application No. PCT/EP2021/072114, filed on Aug. 9, 2021.

(30) Foreign Application Priority Data

Aug. 11, 2020 (EP) .................................... 20190454

(51) Int. Cl.
*G01N 21/78* (2006.01)
*B01L 3/00* (2006.01)
(Continued)

(52) U.S. Cl.
CPC ........ *G01N 21/8483* (2013.01); *B01L 3/5023* (2013.01); *G01N 21/78* (2013.01);
(Continued)

(58) Field of Classification Search
CPC ............... G01N 21/8483; G01N 21/78; G01N 2021/7759; G01N 2201/0221;
(Continued)

(56) References Cited

U.S. PATENT DOCUMENTS

| | | | | |
|---|---|---|---|---|
| 5,114,678 A | 5/1992 | Crawford et al. | | |
| 2008/0044082 A1 * | 2/2008 | Muller | G01J 3/50 | 382/162 |

(Continued)

FOREIGN PATENT DOCUMENTS

| | | |
|---|---|---|
| CN | 111443211 A | 7/2020 |
| EP | 3 018 470 A1 | 5/2016 |

(Continued)

OTHER PUBLICATIONS

Hoult et al., Polystyrene Film as a Standard for Testing FT-IR Spectrometers, Spectroscopy, Feb. 1, 2013, vol. 28, Issue 2, 8 pages.

(Continued)

*Primary Examiner* — Melvin C. Mayes
*Assistant Examiner* — Sophia Y Lyle
(74) *Attorney, Agent, or Firm* — Bose McKinney & Evans LLP

(57) ABSTRACT

A test strip fixation device for use in a method of determining analyte concentration in a body fluid using a mobile device with a camera. The device has top and bottom surfaces, has an essentially planar shape, and also has a cut-out portion configured for application of a body fluid sample. The top surface has color reference fields with known reference color values, including grey and non-grey reference fields. The grey reference fields are symmetrically arranged around the cut-out portion and around at least some of the non-grey color reference fields. The top surface also has position detection code elements. The bottom surface has a connector configured for detachable connection of an (Continued)

optical test strip relative to the test strip fixation device, and a reagent test region of the test strip can be aligned with the cut-out portion. A method of using the device is also disclosed.

16 Claims, 5 Drawing Sheets

(51) Int. Cl.
*G01N 21/77* (2006.01)
*G01N 21/84* (2006.01)

(52) U.S. Cl.
CPC ................. *B01L 2300/0825* (2013.01); *G01N 2021/7759* (2013.01); *G01N 2201/0221* (2013.01)

(58) Field of Classification Search
CPC ..... G01N 2021/8488; G01N 33/48771; G01N 2201/127; B01L 3/5023; B01L 2300/0825; A61B 5/14532; A61B 5/1486; A61B 5/6898; G01J 3/463; G01J 3/52; G06V 30/18105; G06V 30/41
See application file for complete search history.

(56) References Cited

U.S. PATENT DOCUMENTS

| | | | | |
|---|---|---|---|---|
| 2008/0081341 | A1* | 4/2008 | Maher | G01N 33/54388 436/514 |
| 2009/0197296 | A1* | 8/2009 | Martin | G01N 33/52 435/29 |
| 2012/0063652 | A1 | 3/2012 | Chen et al. | |
| 2012/0288195 | A1 | 11/2012 | Lings et al. | |
| 2013/0136349 | A1* | 5/2013 | Lings | G01J 3/463 382/165 |
| 2015/0055134 | A1 | 2/2015 | Papautsky et al. | |
| 2015/0325006 | A1 | 11/2015 | Adiri et al. | |
| 2018/0146175 | A1 | 5/2018 | Mui | |
| 2019/0073763 | A1 | 3/2019 | Li et al. | |
| 2020/0126226 | A1* | 4/2020 | Adiri | G06T 7/0012 |
| 2021/0096083 | A1 | 4/2021 | Klein et al. | |
| 2023/0097619 | A1 | 3/2023 | Luo et al. | |

FOREIGN PATENT DOCUMENTS

| | | | | |
|---|---|---|---|---|
| EP | 3 143 378 | A1 | 3/2017 | |
| JP | H 04-221760 | A | 8/1992 | |
| JP | 2015-500582 | A | 1/2015 | |
| JP | 2018-155490 | A | 10/2018 | |
| KR | 102094780 | B1 * | 3/2020 | G01N 21/78 |
| RU | 107 364 | U1 | 8/2011 | |
| TW | 202001228 | A | 1/2020 | |
| WO | WO-2006106084 | A1 * | 10/2006 | A61B 5/150854 |
| WO | WO-2010066236 | A1 * | 6/2010 | G01J 1/0295 |
| WO | WO 2014/178062 | A2 | 11/2014 | |
| WO | WO 2019/113812 | A1 | 6/2019 | |
| WO | WO 2020/016616 | A1 | 1/2020 | |
| WO | WO 2020/089188 | A1 | 5/2020 | |

OTHER PUBLICATIONS

International Search Report and Written Opinion of the International Searching Authority, PCT/EP2021/072114, Nov. 4, 2021, 9 pages.
Hönes et al., The Technology Behind Glucose Meters: Test Strips, Diabetes Technology & Therapeutics, vol. 10, Supplement 1, 2008, pp. S-10-S-26.

* cited by examiner

TEST STRIP FIXATION DEVICE FOR OPTICAL MEASUREMENTS OF AN ANALYTE

RELATED APPLICATIONS

This application is a continuation of International Patent Application No. PCT/EP2021/072114, filed Aug. 9, 2021, which claims priority to EP 20 190 454.7, filed Aug. 11, 2020, both of which are hereby incorporated herein by reference.

BACKGROUND

This disclosure relates to a test strip fixation device having on a top surface thereof color reference fields of known reference color values, including grey reference fields, and position detection code elements, the test strip fixation device being adapted to detachably connect an optical test strip to the test strip fixation device. The test strip fixation device is configured to be used in a method for determining a concentration of an analyte in a body fluid by using a mobile device having a camera. Further, this disclosure relates to a kit comprising the test strip fixation device and an optical test strip to be used together with the test strip fixation device in such a method. The test strip fixation device and methods specifically may be used in medical diagnostics, for example, in order to qualitatively or quantitatively detect one or more analytes in body fluids, such as for detecting glucose in blood or interstitial fluid.

In the field of medical diagnostics, in many cases, one or more analytes have to be detected in samples of a body fluid, such as blood, interstitial fluid, urine, saliva or other types of body fluids. Examples of analytes to be detected are glucose, triglycerides, lactate, cholesterol or other types of analytes typically present in such body fluids. According to the concentration and/or the presence of the analyte, an appropriate treatment may be chosen, if necessary.

Generally, devices and methods known to the skilled person make use of test elements comprising one or more test chemicals, which, in the presence of the analyte to be detected, are capable of performing one or more detectable detection reactions, such as optically detectable detection reactions. With regard to the test chemicals comprised in test elements, reference may be made, e.g., to J. Hoenes et al.: The Technology Behind Glucose Meters: Test Strips, Diabetes Technology & Therapeutics, Volume 10, Supplement 1, 2008, S-10 to S-26.

In analytical measurements, specifically analytical measurements based on color formation reactions, one technical challenge resides in the evaluation of the color change which is due to the detection reaction. Besides using dedicated analytical devices, such as handheld blood glucose meters, the use of generally available electronic devices such as smart phones and portable computers or other mobile devices has become more and more popular over the recent years.

As opposed to laboratory measurements and measurements performed by using dedicated analytical measurement devices, when using mobile computing devices such as smart phones, various additional influences need to be taken into account, such as, for example, lighting conditions and positioning aspects, particularly a positioning of the mobile device relative to an optical test strip and/or relative to any auxiliary means such as a color reference chart. Sometimes such additional influences may be difficult to be adequately taken into account. In order to ensure or improve the reliability of results of analyte detection in these cases nonetheless, it is therefore beneficial to appropriately address any such aspects which may be expected to have an impact on the desired analyte detection or measurement.

In particular, if an auxiliary means such as a color reference chart is employed together with an optical test strip in a method for determining a concentration of an analyte in a body fluid by using a mobile device having a camera, then the camera needs to be aligned with, or positioned relative to, both the optical test strip and the color reference chart. To facilitate this effort, sometimes reference colors are used directly on a support which also accommodates the test chemicals. However, if a color reference chart is used separately from an optical test strip, then the positioning of the optical test strip on the one hand and of the color reference chart on the other hand needs to conform to the requirements of the measurement method, which usually involves positioning of the test strip and the reference chart relative to the camera as well as relative to each other. The latter aspect, i.e., a positioning of the test strip and the reference chart relative to each other, is all the more relevant if the measurement method not only involves reading color information from the test chemical, like from a reagent test field on an optical test strip, but also involves reading other information from the optical test strip, such as additional color information, calibration information, or lot-specific information. Such additional information may, e.g., be provided on a carrier or on a support of the optical test strip.

Thus, camera-based evaluation of optical test strips usually requires detecting the test strip and its reagent test field, respectively, and, if a color reference chart having color reference fields is used, said chart and the color reference field positions thereon have to be detected as well. To this end, it is furthermore important to ensure a high quality of images taken by a camera, such as a camera of a mobile device, in order to be able to process such images in a method of an analyte measurement, which method is performed by using a mobile device. In this regard, however, the computational power required needs to be taken into account. A high quality of images would include one or more of the following aspects:

- The image should be sharp (e.g., the color reference chart and the optical test strip are in a focal plane).
- The exposure is appropriate.
- Good pixel resolution (at least full HD, i.e., a resolution of 1920×1080 pixel; in some instances, HD may suffice, i.e., a resolution of 1280×720 pixel).
- A good dynamic range should be available, e.g., real 8-bit resolution.
- No, or only non-significant compression should be used (e.g., color, space).
- For a color reference chart, knowing or determining the relative positions between the test field of the test strip and the relevant color reference fields on the chart (such as colored or grey fields), in an image captured by a camera of a mobile device, is mandatory.
- With a color reference chart, for each color reference field specific statistical values (like, e.g., mean color values) and/or a histogram may need to be derived to allow for properly working function checks and/or for correct analyte calculation.
- For a color reference chart, cross-relations between test and/or color reference fields may be derived in order to calculate, or to ensure, the accuracy of the analyte concentration.

Current systems which involve use of a colored reference chart often allow the user to place the test strip on top of the reference chart, in principle anywhere on the reference chart. Therefore, in such a scenario, the test strip has to be safely detected, and in case necessary, the user may need to be informed so as to better align the test strip with the color reference chart.

For high-end smartphones, all required elements (test strip, reagent test field, color reference fields, etc.), as well as checking the image quality per frame recorded, usually is possible many times per second, e.g., providing for about 20 frames per second. However, for low-end to mid-range smartphones, which are widely in use, only a few frames or even only a single frame per second may be processed in such a manner. Therefore, it is crucial to reduce any pixel-based calculations to be performed by the mobile device (like, e.g., finding the test strip and/or the reagent test field) as much as possible.

EP 3018470 A1 describes a method of a terminal measuring biometric information, the method comprising: receiving an image of a biosensor comprising a reagent pad on which a sample is collected; and comparing brightness information of a reacting region of the reagent pad in the received image with reference brightness information in the received image to determine a value of a reagent reaction between the reagent pad and the sample. The biosensor may comprise, in addition to the reagent pad, also the reference brightness information and identification information.

EP 3143378 A1 relates to a method comprising: capturing an image of a dipstick having colored test reagents, and a calibration array having a plurality of colored reference elements; deriving, based on the captured image, local illumination parameters associated with the dipstick and the calibration array; determining whether the illumination parameters are within a set of predefined illumination boundary conditions; applying one or more image enhancement operation to the captured image, to yield an enhanced image, based on predefined mapping between the derived illumination parameters and one or more required adjustments; and interpreting the colored test reagents, based on the colored reference elements, in the enhanced image.

WO 2019/113812 A1 describes a method for quantitatively detecting the concentration of a solution to be detected on the basis of color recognition comprising inter alia the following main steps: step S4, locating a color reaction area and information corresponding to each color block by means of an image recognition technique, and converting diffuse reflection light information into color coordinates in a specific color space; step S5, performing, by means of optical principles, equivalent calculations on the color reaction area, color block diffuse reflection information, ambient lighting, and other external factors to obtain equivalent ambient lighting; step S7, calculating a color reaction area standard color; and step S8, calculating the concentration of a solution to be detected by means of a correspondence between the color reaction area standard color and the concentration of the solution to be detected. A card slot may be used to place the color reaction area, and the card slot is placed in the middle of the observation range, wherein the color blocks are distributed in a matrix on both sides of the card slot, and the color block and the card slot are symmetrically distributed at the center of the observation range.

U.S. Publication No. 2018/0146175 A1 relates to a system for determining a true color of an unknown color sample, comprising: a template including a cut-out and a plurality of concentric rings around the cut-out, each of the concentric rings having offset gray scales modulated as a function of an angle of a polar coordinate, wherein there is a trigonometric relationship between the gray scales of the plurality of concentric rings; a RGB color module configured to determine, in an image of the template over the unknown color sample, a first radial cross-section of one of the concentric rings having an intensity that matches a determined average red color value of the image of the unknown color sample and to determine a true average red color value of the unknown color sample based on an intensity profile of the one of the concentric rings and a polar angle of the first radial cross-section; and an angular module configured to determine the polar angle of the first radial cross-section.

Despite the advantages involved in using mobile computing devices for the purpose of performing an analytical measurement, one of the remaining technical challenges still is to ensure, or to enhance, the reliability of test results of analyte measurements involving such mobile computing devices and test elements like optical test strips, in view of any aspects which may be expected to have an impact on the desired analyte detection or measurement, such as an impact of ambient lighting conditions and relative orientation of an optical test strip or of a color reference chart.

SUMMARY

It is therefore desirable to provide devices and methods which at least partially address the above-mentioned challenges. Specifically, it is desirable to provide devices and methods which allow for a reliable mobile-based determination of a concentration of an analyte in a body fluid, and which minimize any impact on the analyte detection or measurement from external factors like ambient lighting conditions and relative positioning of a mobile computing device and an optical test strip. Particularly, the devices and methods to be provided should be adapted to include an adequate use of reference colors provided separately from the optical test strip. Additionally, all required elements, such as, e.g., color reference fields on a color reference chart, should be identified in a digital image at low computational cost.

As used in the following, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once. It shall be understood for purposes of this disclosure and appended claims that, regardless of whether the phrases "one or more" or "at least one" precede an element or feature appearing in this disclosure or claims, such element or feature shall not receive a singular interpretation unless it is made explicit herein. By way of non-limiting example, the terms "analyte," "camera," "chip" and "image," to name just a few, should be interpreted wherever they appear in this disclosure and claims to mean "at least one" or "one or more" regardless of whether they are introduced with the expressions "at least one" or "one or more." All other terms used herein should be similarly interpreted unless it is made explicit that a singular interpretation is intended.

Further, as used in the following, the terms "preferably," "more preferably," "particularly," "more particularly," "specifically," "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of this disclosure, a test strip fixation device is disclosed. The structural elements of said test strip fixation device will be described in detail further below herein.

It is to be noted that the test strip fixation device according to this disclosure is configured to be used in a method for determining a concentration of an analyte in a body fluid by using a mobile device having a camera, wherein further an optical test strip is used. Accordingly, the requirements for such an optical detection or measurement of an analyte, some of which have been discussed in the context of the background art herein above, at least to some extent determine the design and arrangement of at least some of the structural elements of the test strip fixation device. Therefore, and because the method for determining a concentration of an analyte in a body fluid by using a mobile device having a camera, wherein further an optical test strip is used, represents another aspect of this disclosure, it is appropriate to firstly discuss some general aspects of said method, before explaining the details of the test strip fixation device itself. Thereby, it can be better understood how the test strip fixation device, in connection with the optical test strip, may be used in the method for determining a concentration of an analyte.

The method for determining a concentration of an analyte in a body fluid referred to herein comprises using a mobile device having a camera and a processor. Furthermore, an optical test strip comprising a carrier and a reagent test region arranged on said carrier is used, wherein said carrier comprises a transparent zone or a cut-out zone at the location of said reagent test region. The optical test strip is detachably connected to the test strip fixation device. A sample of the body fluid is applied to the reagent test region, whereby a color is formed which can be observed from the top surface through the cut-out portion of the test strip fixation device and through the transparent zone or through the cut-out zone of the carrier of the optical test strip. The method comprises capturing by the camera at least one image containing at least a part of the optical test strip and at least a part of the top surface of the test strip fixation device. The image further comprises at least a part of the reagent test region having the sample of the body fluid applied thereto, and further comprises at least a part of the color reference fields. The method further comprises determining, by the processor, the concentration of the analyte from the color formed in the reagent test region, taking into account the color reference fields.

The term "determining a concentration of an analyte in a body fluid," also referred to as an "analytical measurement," as used herein, is a broad term and is to be given its ordinary and customary meaning to a person of ordinary skill in the art and is not to be limited to a special or customized meaning. The term specifically may refer, without limitation, to a quantitatively and/or qualitatively determination of at least one analyte in an arbitrary sample or aliquot of body fluid. For example, the body fluid may comprise one or more of blood, interstitial fluid, urine, saliva or other types of body fluids, particularly blood. The result of the determining of the concentration, as an example, may be a concentration of the analyte and/or the presence or absence of the analyte to be determined. Specifically, as an example, the analytical measurement may be a blood glucose measurement, thus the result of the analytical measurement may, for example, be a blood glucose concentration. In particular, an analytical measurement result value may be determined by the analytical measurement.

Consequently, the term "analyte concentration value," often also referred to as "analytical measurement result value," as used herein, is a broad term and is to be given its ordinary and customary meaning to a person of ordinary skill in the art and is not to be limited to a special or customized meaning. The term specifically may refer, without limitation, to a numerical indication of an analyte concentration in a sample.

Without narrowing the scope, this disclosure specifically may be described with respect to blood glucose measurements. It shall be noted, however, that this disclosure may also be used for other types of analytical measurements using test elements. The at least one analyte, as an example, may be or may comprise one or more specific chemical compounds and/or other parameters. As an example, one or more analytes may be determined which take part in metabolism, such as blood glucose. Additionally or alternatively, other types of analytes or parameters may be determined, e.g., a pH value.

The method, as outlined above, comprises using at least one mobile device having at least one camera. The term "mobile device" as used herein is a broad term and is to be given its ordinary and customary meaning to a person of ordinary skill in the art and is not to be limited to a special or customized meaning. The term specifically may refer, without limitation, to a mobile electronics device, more specifically to a mobile communication device such as a cell phone or smartphone. Additionally or alternatively, the mobile device may also refer to a tablet computer or another type of portable computer having at least one camera and at least one processor. Furthermore, additionally or alternatively, the mobile device may also refer to computers, like a laptop computer or a PC, equipped with an internal or an external camera, such as an external webcam.

The term "camera" as used herein is a broad term and is to be given its ordinary and customary meaning to a person of ordinary skill in the art and is not to be limited to a special or customized meaning. The term specifically may refer, without limitation, to a device having at least one imaging element configured for recording or capturing spatially resolved one-dimensional, two-dimensional or even three-dimensional optical data or information. As an example, the camera may comprise at least one camera chip, such as at least one CCD chip and/or at least one CMOS chip configured for recording images. As used herein, without limitation, the term "image" specifically may relate to data recorded by using a camera, such as a plurality of electronic readings from the imaging device, such as the pixels of the camera chip.

The camera, besides the at least one camera chip or imaging chip, may comprise further elements, such as one or more optical elements, e.g., one or more lenses. As an example, the camera may be a fix-focus camera, having at least one lens which is fixedly adjusted with respect to the camera. Alternatively, however, the camera may also comprise one or more variable lenses which may be adjusted, automatically or manually. This disclosure specifically shall be applicable to cameras as usually used in mobile applications such as notebook computers, tablets or, specifically, cell phones such as smart phones. Thus, specifically, the camera may be part of a mobile device which, besides the at least one camera, comprises one or more data processing devices such as one or more data processors. Other cameras, however, are feasible.

The test strip fixation device is configured to be used in connection with an optical test strip, particularly in the method as described herein. Accordingly, at least one optical test strip having at least one reagent test region, also referred to as a "test field" herein, is used. The term "optical test strip" as used herein is a broad term and is to be given its ordinary and customary meaning to a person of ordinary skill in the art and is not to be limited to a special or customized meaning. The term specifically may refer, without limitation, to an arbitrary element or device configured for performing a color-change detection reaction. The optical test strip may also be referred to as test strip or test element, wherein all three terms may refer to the same element. The optical test strip may particularly have a reagent test region containing at least one test chemical for detecting at least one analyte. The optical test strip, as an example, may comprise at least one substrate, such as at least one carrier, with the at least one reagent test region applied thereto or integrated therein. In particular, the optical test strip may further comprise one or more reference areas, such as a white field and/or a black field. Additionally or alternatively, the substrate or carrier itself may be or may comprise such a reference area. As an example, the at least one carrier may be strip-shaped, thereby rendering the test element a test strip. These test strips are generally widely in use and available. One test strip may carry a single test field or a plurality of test fields having identical or different test chemicals comprised therein.

As further used herein, the term "reagent test region" (also referred to as a "test field" herein) is a broad term and is to be given its ordinary and customary meaning to a person of ordinary skill in the art and is not to be limited to a special or customized meaning. The term specifically may refer, without limitation, to a coherent amount of the test chemical, such as to a field, e.g., a field of round, polygonal or rectangular shape, having one or more layers of material, with at least one layer of the test field having the test chemical comprised therein. With regard to the test chemicals comprised in optical test strips, as an example reference is made to J. Hoenes et al.: The Technology Behind Glucose Meters: Test Strips, Diabetes Technology & Therapeutics, Volume 10, Supplement 1, 2008, S-10 to S-26. Other types of test chemistry are possible and may be used for performing this disclosure.

As outlined above, the method comprises capturing at least one image of at least a part of the reagent test region having the sample of the body fluid applied thereto, by using the camera. The term "capturing at least one image" as used herein is a broad term and is to be given its ordinary and customary meaning to a person of ordinary skill in the art and is not to be limited to a special or customized meaning. The term specifically may refer, without limitation, to one or more of imaging, image recording, image acquisition, image capturing. The term "capturing at least one image" may comprise capturing a single image and/or a plurality of images such as a sequence of images. For example, the capturing of the image may comprise recording continuously a sequence of images such as a video or a movie. The capturing of the at least one image may be initiated by the user action or may automatically be initiated, e.g., once the presence of the at least one object within a field of view and/or within a predetermined sector of the field of view of the camera is automatically detected. These automatic image acquisition techniques are known, e.g., in the field of automatic barcode readers, such as from automatic barcode reading apps. The capturing of the images may take place, as an example, by acquiring a stream or "live stream" of images with the camera, wherein one or more of the images, automatically or by user interaction such as pushing a button, are stored and used as the at least one first image or the at least one second image, respectively. The image acquisition may be supported by a processor of the mobile device, and the storing of the images may take place in a data storage device of the mobile device.

The capturing of the at least one image may comprise capturing at least one image with having the sample of the body fluid applied to the test strip and, further and optionally, such as before capturing the image with the sample applied to the test strip, capturing at least one image without having the sample of the body fluid applied to the test strip. The latter image specifically may be used for comparative purposes and may also be referred to as a "blank image" or "dry image." The sample application generally may take place, as an example, directly or indirectly, e.g., via at least one capillary element. The at least one image captured after sample application may typically also be referred to as the "wet image," even though the sample may have dried when the image is actually captured. The wet image typically may be taken after having waited for at least a predetermined waiting time, such as after five seconds or more, in order to allow for the detection reaction to take place. Thus, as an example, the method may comprise, between taking the at least one optional dry image and the at least one wet image, waiting for at least a predetermined minimum amount of time. This predetermined minimum amount of time specifically may be sufficient for a detection reaction to take place in the test strip. As an example, the minimum amount of waiting time may be at least 5 s.

The method comprises determining the analyte concentration, particularly an analyte concentration value, from color formation of the test field. Thus, the method may be an analytical measurement including a change of at least one optical property of an optical test strip, which change may be measured or determined visually by using the camera. Specifically, the analytical measurement may be or may comprise a color formation reaction in the presence of the at least one analyte to be determined. The term "color formation reaction" as used herein is a broad term and is to be given its ordinary and customary meaning to a person of ordinary skill in the art and is not to be limited to a special or customized meaning. The term specifically may refer, without limitation, to a chemical, biological or physical reaction during which a color, specifically a reflectance, of at least one element involved in the reaction, changes with the progress of the reaction. The color formation may be detected by the mobile device, such as by a processor of the mobile device, and may be evaluated quantitatively, such as by deriving, from the at least one image, at least one parameter quantifying or characterizing the color formation of the test field due to the presence and concentration of the analyte in the body fluid. To this end, one or more specific color coordinates may be used. Thus, the mobile device and specifically the processor of the mobile device may be configured for determining a color change by determining a change of one or more color coordinates taking place due to the detection reaction.

The at least one analyte concentration, particularly analyte concentration value, is determined from the color formation of the test field. For this purpose, the at least one image is used. The analyte concentration value, as an example, may be a numerical value indicator of a result of the analytical measurement, such as indicative of the concentration of at least one analyte in the sample, such as a blood glucose concentration.

The method may further comprise the step of displaying the analyte concentration value, such as on a display of the mobile device. Additionally or alternatively, the method may comprise storing the at least one analyte concentration value in at least one data storage device of the mobile device. Again additionally and alternatively, the method may further comprise transmitting the at least one analyte concentration value via at least one interface and/or via at least one data transmission network, such as to another computer, e.g., for further evaluation.

Now, focusing on the test strip fixation device of this disclosure, said test strip fixation device being configured to be used in a method for determining a concentration of an analyte in a body fluid by using a mobile device having a camera, the structural elements of said test strip fixation device will be described in more detail.

Accordingly, in the first aspect, this disclosure particularly relates to a test strip fixation device:

being configured to be used in a method for determining a concentration of an analyte in a body fluid by using a mobile device having a camera, said method comprising capturing by the camera at least one image containing at least a part of an optical test strip and at least a part of said test strip fixation device, the optical test strip having a sample of the body fluid applied onto a reagent test region of the optical test strip, wherein the image comprises at least a part of the reagent test region having the sample of the body fluid applied thereto, and wherein the image comprises at least a part of a top surface of the test strip fixation device;

said test strip fixation device comprising:

a) an essentially planar shape;

b) a cut-out portion;

c) a top surface comprising a plurality of color reference fields having known reference color values, including grey reference fields which are locally, and in particular essentially symmetrically, arranged around the cut-out portion and around at least some of the non-grey color reference fields; and comprising position detection code elements;

d) a bottom surface comprising a fixation element for detachable connection of the optical test strip relative to said test strip fixation device, such that the reagent test region can be aligned with the cut-out portion.

The test strip fixation device of this disclosure provides for a detachable connection of an optical test strip to said test strip fixation device; for a plurality of color reference fields having known reference color values, which color reference fields are arranged on the top surface of said test strip fixation device; and for a cut-out portion which can be aligned with the reagent test region of the optical test strip, if the optical test strip is connected to said test strip fixation device. Thereby, an exact positioning (i) of the optical test strip relative to the test strip fixation device; (ii) of the optical test strip relative to the color reference fields; and (iii) of the reagent test region of the optical test strip relative to the cut-out portion can be achieved in a reproducible and efficient manner. All of these positioning aspects contribute to making a method for determining a concentration of an analyte in a body fluid more reliable, said method using, in addition to the optical test strip and the test strip fixation device, a mobile device having a camera. In such a measurement method, positioning of both the test strip and the color reference fields relative to the camera as well as relative to each other needs to be ensured for optimal performance of said method, e.g., in terms of accuracy of the measurement results achieved. The latter aspect, i.e., the positioning of the test strip and the color reference fields relative to each other, is particularly relevant if the measurement method not only involves reading color information from the test chemical, like from the reagent test field of the optical test strip, but also involves reading other information from the optical test strip, such as additional color information, calibration information, or lot-specific information; such additional information, e.g., being provided on a carrier or on a support of the optical test strip.

Furthermore, the test strip fixation device of this disclosure enables a reduction of image processing capacities required, especially of any pixel-based image processing capacities, by defining and fixing the position of an optical test strip, and of a reagent test field provided on said test strip, relative to the elements (e.g., color reference fields) on the top surface. Particularly, in combination with using position detection code elements, like ArUco codes, for a quick and an easy detection of the top surface of the test strip fixation device in the (digital) image, all required elements may be identified at relatively low computational cost, i.e., in a resource-efficient manner.

The test strip fixation device has an essentially planar shape, e.g., like a flat cuboid. Its top surface may be provided in any geometrical form or shape which provides a sufficiently large surface area in order to accommodate the cut-out portion, the plurality of color reference fields, and the position detection code elements. As such, any rectangular, trapezoid, oval or round shape of the test strip fixation device or of its top surface may be appropriate. Typically, the test strip fixation device comprises four outer edges, two of which form a first pair of outer edges and two of which form a second pair of outer edges. The outer edges of at least one of said pairs, specifically of both of said pairs, may be arranged essentially parallel to one another. Furthermore, the outer edges of the first pair may be longer than the outer edges of the second pair. Particularly, the test strip fixation device has an essentially rectangular or trapezoid shape, and more particularly an essentially rectangular shape. Other shapes may be appropriately used as well.

Generally, the test strip fixation device has a height of no more than 10 mm, specifically of no more than 5 mm, including the top surface, the bottom surface and the fixation element. Advantageously, a central region of the test strip fixation device, particularly relative to the first and second pair of outer edges, may provide a maximum height of the test strip fixation device. Additionally or alternatively, the bottom surface may, at least in part, be beveled from at least one of the outer edges, specifically from at least two of the outer edges, and more specifically from all of the outer edges, towards a central region of the test strip fixation device, particularly relative to the first and second pair of outer edges. Advantageously, the central region of the test strip fixation device has a planar surface, specifically a planar surface which is essentially parallel to the top surface. In this respect, the term “essentially parallel” may refer to a parallel orientation, and/or to a deviation from a parallel orientation of from >0° to 10° and particularly of from >0° to 5°. As an example, the central region of the test strip fixation device may provide a maximum height of the test strip fixation device, wherein the central region has a planar surface, specifically a planar surface which is essentially parallel to the top surface. The central region of the test strip fixation device providing a maximum height and/or having a planar surface greatly facilitates user handling of the test strip fixation device because the device can be placed steadily on any flat surface, like on a table, and can more easily be picked up therefrom. This is particularly useful if handling of the test strip fixation device requires picking up the device from such a flat surface for the purpose of conducting an analyte test with a test strip, e.g., with a blood glucose test strip.

Alternatively, the bottom surface, particularly the planar surface of a central region of the test strip fixation device, may deviate from a parallel orientation relative to the top surface, such that the top surface is skewed by an angle, e.g., of from 5° to 25°, or from 5° to 15°, relative to the bottom surface (and, therefore, relative to a horizontal bearing surface, such as a surface of a table, when the test strip fixation device is placed onto said bearing surface). In such an arrangement, a region adjacent to a first one of the outer edges of the test strip fixation device may provide a maximum height of the test strip fixation device. Additionally, a region adjacent to the one of the outer edges of the test strip fixation device which is located opposite the first one of the outer edges may provide a minimum height of the test strip fixation device. Advantageously, in such an arrangement, any effects of gloss, in particular from ambient light and/or from a light source of the mobile device, such as an LED, may be minimized, or even avoided, due to the angle of the top surface relative to the camera of the mobile device, which angle is pre-determined at least to some extent in this case.

The cut-out portion usually is located away from the outer edges of the test strip fixation device. Accordingly, the cut-out portion may be located in a central area of the test strip fixation device, particularly relative to the first and second pair of outer edges. Additionally or alternatively, the cut-out portion may be located away from a geometric center of the test strip fixation device, specifically away from a geometric center defined by the first and second pair of outer edges. Thereby, user handling of the test strip fixation device can be improved because a test strip, when inserted into the device, may extend beyond the device or beyond an outer edge thereof, such that the test strip can be grasped more easily. Moreover, any impact from illumination effects like gloss may be minimized or avoided by appropriately locating the cut-out portion within the test strip fixation device, as described in this paragraph.

Typically, at least some, or all, of the position detection code elements are located essentially at the outer edges of the test strip fixation device. Additionally or alternatively, at least some, or all, of the position detection code elements are located such that they delimit the color reference fields, specifically including the grey reference fields, on the top surface.

Suitable position detection code elements comprise any bar codes and squared markers. Additionally or alternatively, the position detection code elements may comprise information specific to the test strip fixation device, said information typically comprising at least lot-specific information and/or calibration information relating to the color reference fields. Particularly suitable position detection code elements comprise ArUco markers.

Furthermore, the top surface of the test strip fixation device may comprise one or more, e.g., 2, 4 or 6, check fields which each exhibit at least one edge of high contrast, specifically at least one sharp edge of high contrast. Particularly, each of the check fields may comprise, or consist of, two or more distinct areas, wherein at least one of said areas is white and at least another one of said areas is black. Specifically, said check fields may consist of at least one white area and at least one black area, e.g., of rectangular shape, wherein the black and white areas are located directly adjacent to each other. Thereby, the black and white areas of the check fields form an edge, specifically a sharp edge, at the transition in between them, i.e., at the transition from the black area to the white area. For example, four check fields may be provided, each of which has one white area and one black area, wherein said white area and said black area are located directly adjacent to one another within each of the check fields. The check fields may be distributed symmetrically or randomly on the top surface, e.g., all or some of them may be located in the proximity of the outer edges of the test strip fixation device. Advantageously, in any given situation when a measurement is taken (i.e., when an image is captured by the camera of a mobile device at a specific location with specific local illumination conditions) said check fields facilitate determination of the full range of detection from black to white. Moreover, by providing a clearly defined sharp transition edge from black to white, they also allow reliable and efficient evaluation of the sharpness of an image captured.

In an embodiment, the grey reference fields comprise at least two, or at least three, different grey shades, e.g., 3, 4, 5 or more different grey shades, more specifically 3 different grey shades. The different grey shades generally exclude pure white and pure black fields. However, the top surface of the test strip fixation device may additionally comprise one or more white and/or black reference fields, optionally in addition to one or more check fields as mentioned herein above. Specifically, the grey reference fields comprising the at least two or the at least three different grey shades are arranged locally, and in particular essentially symmetrically, around the cut-out portion and/or around at least some, or all, of the non-grey color reference fields. More specifically, the grey reference fields comprising the at least two or the at least three different grey shades are arranged locally, and in particular essentially symmetrically, around the cut-out portion and around each of the non-grey color reference fields. The term “arranged locally around” in this respect refers to the grey reference fields being located in close proximity to the cut-out portion and/or to the non-grey color reference fields, respectively. Advantageously, the grey reference fields are arranged locally around the cut-out portion and/or around the non-grey color reference fields such that at least two, or at least three, different grey shades are arranged at least two, or at least three or at least four, times around the cut-out portion and/or around the non-grey color reference fields. In other words, in the latter arrangement the cut-out portion and/or at least some, or all, of the non-grey color reference fields are surrounded by two, three, four or more redundant sets of grey reference fields, each of said sets comprising said at least two, or at least three, different grey shades. Particularly at least two, more particularly three or four, of said redundant sets of grey reference fields may be arranged around the cut-out portion and/or around the non-grey color reference fields.

Generally, the non-grey color reference fields may be distributed equally over the top surface of the test strip fixation device, specifically in such a way that the plurality of color reference fields may be distributed essentially over the entire top surface. The non-grey color reference fields may be distributed symmetrically or randomly over the top surface. If non-grey color reference fields having the same color are used, e.g., if pairs of two non-grey color reference fields having the same color are present on the top surface, then the non-grey color reference fields of each such pair may advantageously be distributed in a non-symmetrical way over the top surface. In such a non-symmetrical distribution, chances are enhanced that, for any specific illumination condition, at least one non-grey color reference field of a given pair of non-grey color reference fields may be taken into account for the purpose of an analytical measurement, while the other one of said pair of non-grey color reference fields may not be employed, e.g., due to insufficient local illumination conditions at its particular location on the top surface of the test strip fixation device.

The fixation element of the test strip fixation device generally comprises one or more guiding elements for guiding the optical test strip during insertion thereof into the test strip fixation device. Suitable guiding elements may be selected from the list comprising a guide slot, a guide notch, a guide groove, a guide channel, a guide track, an engagement hook, a lug, a loop, a dent, an indentation, a depression, a recess, a cavity, a deepening, a trough, a projection, an aperture, and an orifice. Specifically, the fixation element comprises at least two or at least three of said guiding elements. More specifically, the fixation element comprises at least two of a guide channel, an orifice, and an engagement hook.

In some embodiments, the top surface of the test strip fixation device may include a protecting frame. Specifically, such a protecting frame may comprise a height of up to 0.5 mm or of up to 1 mm, and may surround at least a part of the top surface, or may surround the complete top surface of the test strip fixation device. Advantageously, the protecting frame shields the top surface and the elements on the top surface, at least to some extent, from any detrimental impact that may occur during handling of the test strip fixation device.

The top surface and the bottom surface of the test strip fixation device, particularly including the fixation element and/or the protecting frame, may be formed as a one-piece injection molded part. The color reference fields and/or the position detection code elements can be applied to the top surface by a printing process. Additionally or alternatively, the color reference fields and/or the position detection code elements may be printed onto a label which is applied to the top surface. In the latter case of a label, provision of a protecting frame, as described herein above, may be particularly beneficial.

In a further aspect of this disclosure, a kit is provided comprising the test strip fixation device of this disclosure and an optical test strip. Accordingly, the test strip fixation device additionally comprises an optical test strip which is adapted to be detachably connected to said test strip fixation device. Typically, said optical test strip comprises a carrier and a reagent test region for application of the sample of body fluid. The reagent test region may be arranged on said carrier. Advantageously, said carrier has a transparent zone or a cut-out zone at the location of said reagent test region, such that, when the test strip is connected to the test strip fixation device, the test field may be observed when looking through the cut-out portion.

The cut-out portion of the test strip fixation device typically has a size no smaller than the reagent test region. Specifically, the cut-out portion has a size larger than the reagent test region of the optical test strip. More specifically, the cut-out portion has a size which, if the optical test strip is connected to the fixation element of the test strip fixation device, allows observation of at least a part of the carrier of the optical test strip, particularly a part of the carrier which is adjacent to the reagent test region. Advantageously, the part of the carrier of the optical test strip to be observed may comprise a white reference field and/or a black reference field. The white reference field may be provided by a white color of the carrier itself.

The fixation element may be arranged essentially perpendicularly relative to at least one of the outer edges of the test strip fixation device, specifically relative to at least one of the outer edges of the first or second pair of outer edges. More specifically, the optical test strip, if the optical test strip is connected to the fixation element, extends at least 5 mm, e.g., at least 8 mm, and particularly at least 10 mm, beyond said one of the outer edges.

In a further aspect, as generally described herein above, this disclosure relates to a method for determining a concentration of an analyte in a body fluid by using a mobile device having a camera, an optical test strip, and a test strip fixation device as described herein above, said method comprising:

(i) providing the optical test strip, wherein said optical test strip comprises a carrier and a reagent test region being arranged on said carrier, wherein said carrier comprises a transparent zone or a cut-out zone at the location of said reagent test region;

(ii) detachably connecting said optical test strip to said test strip fixation device; specifically such that a sample application site of the reagent test region faces away from the bottom surface of the test strip fixation device;

(iii) applying a sample of the body fluid to said reagent test region, particularly from the side of the bottom surface of the test strip fixation device, whereby a color is formed in the reagent test region, which color can be observed from the top surface through the cut-out portion of the test strip fixation device and through the transparent zone or through the cut-out zone of the carrier of the optical test strip;

(iv) capturing by the camera at least one image containing at least a part of the optical test strip and at least a part of the top surface of the test strip fixation device, wherein the image comprises at least a part of the reagent test region having the sample of the body fluid applied thereto, wherein the image further comprises at least a part of the color reference fields, including at least a part of the grey reference fields; and (v) determining the concentration of the analyte from the color formed in the reagent test region upon application of the sample of the body fluid, taking into account at least some of the color reference fields, including the grey reference fields.

In an embodiment, the at least one image captured in step (iv) may comprise all of the color reference fields, and specifically including all of the grey reference fields.

Advantageously, the determining the concentration of the analyte in step (v) further comprises taking into account local intensity variations in the at least one image captured in step (iv). Such local intensity variations may occur at the locations of one or more of the color reference fields, e.g., due to non-homogenous illumination conditions. The grey reference fields can be used to account for said local intensity variations at the locations of one or more of the color reference fields. For this purpose, it is particularly useful if the grey reference fields are arranged locally around the cut-out portion and/or around the non-grey color reference fields such that at least two, or at least three, different grey shades are arranged at least two, or at least three or at least four, times around the cut-out portion and/or around the non-grey color reference fields, as described herein above.

Generally, the method for determining a concentration of an analyte in a body fluid according to this disclosure comprises using a mobile device having a camera and a processor. The method comprises the steps recited herein above which, as an example, may be performed in the given order. It shall be noted, however, that a different order also may be possible, at least with regard to some of the steps. Further, it is also possible to perform one or more of the method steps once or repeatedly. Further, it is possible to perform two or more of the method steps simultaneously or in a timely overlapping fashion. The method may comprise further method steps which are not listed.

In another aspect of this disclosure, a computer program is provided, comprising instructions which, when the program is executed by the mobile device as described herein above, cause the mobile device to carry out at least steps iv) and v) of the method described herein above.

In another aspect of this disclosure, a computer-readable storage medium is provided, comprising instructions which, when executed by the mobile device as described herein above, cause the mobile device to carry out at least steps iv) and v) of the method described herein above.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
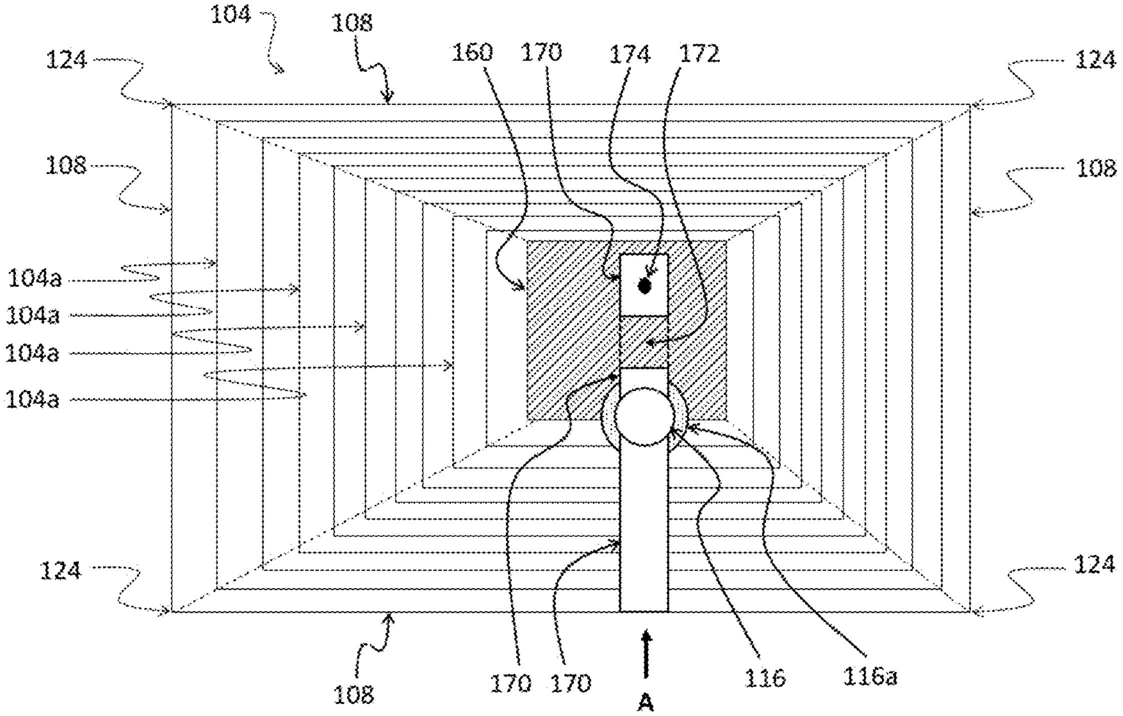
FIG. 1 shows a schematic view of a bottom surface of an exemplary embodiment of a test strip fixation device.
Figure 2:
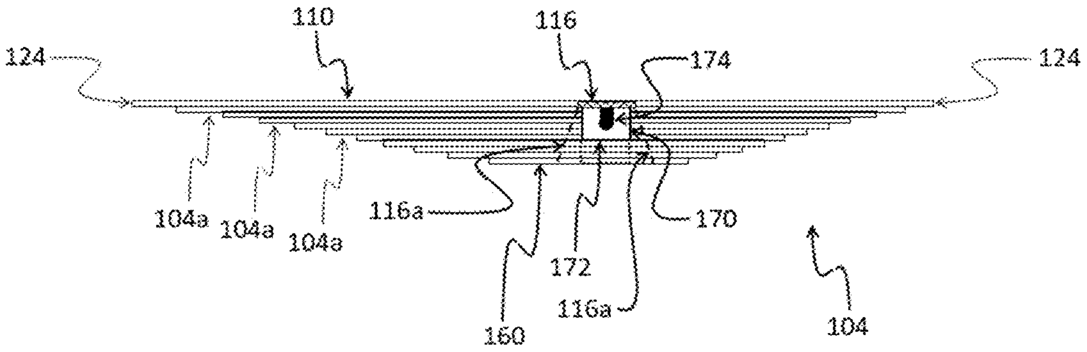
FIG. 2 shows a schematic side view of the embodiment of the test strip fixation device of FIG. 1.

In FIGS. 1 and 2, respectively, an exemplary embodiment of a test strip fixation device is illustrated. FIG. 1 shows the bottom surface (104) of the test strip fixation device of this embodiment, whereas FIG. 2 provides a side view thereof. Overall, the test strip fixation device comprises an essentially planar shape, such that the height of the test strip fixation device is much less than the length and the width of its bottom surface (104) and its top surface (110). Particularly, the test strip fixation device has a rectangular shape, limited by its outer edges (108) and its corners (124), wherein two of the outer edges (108) form a first pair of outer edges, and the other two of the outer edges (108) form a second pair of outer edges, such that the outer edges (108) of each of said pairs are arranged parallel to one another.

Generally, the test strip fixation device may have a height of up to, and no more than 10 mm, including the top surface (110), the bottom surface (104) and the fixation element. In the embodiment shown, a central region (160) of the bottom surface of the test strip fixation device provides a maximum height of the test strip fixation device. Additionally, the bottom surface (104) may, at least in part, be beveled from at least one of the outer edges (108), e.g., from 2, 3 or 4 of the outer edges (108), towards the central region (160) of the bottom surface of the test strip fixation device. In this embodiment, the bottom surface (104) is, at least in part, beveled from all 4 of the outer edges (108) towards the central region (160) of the test strip fixation device, as is depicted in FIGS. 1 and 2 by the lines indicating the beveled parts (104*a*) of the bottom surface (104). Particularly, the central region (160) has a planar surface which is essentially parallel to the top surface (110) of the test strip fixation device. As the skilled person will readily appreciate, the beveled parts (104*a*) of the bottom surface (104) may be designed in the form of a continuously beveled area, i.e., without the miniature steps (104*a*) as depicted in FIGS. 1 and 2, respectively.

Referring again to FIGS. 1 and 2, respectively, a cut-out portion (116) is provided which is located away from the outer edges (108) of the test strip fixation device. Furthermore, the cut-out portion (116) is located in a central area of the test strip fixation device relative to the first and second pair of outer edges (108), particularly in a central area which at least in part overlaps with the central region (160). Additionally, in this embodiment, the cut-out portion (116) is located away from a geometric center defined by the first and second pair of outer edges of the test strip fixation device; in other words, if two straight lines are drawn from each of two of the corners (124) of the bottom surface (104) of the test strip fixation device, wherein said each two of the corners (124) are diagonally opposing each other, then the intersection of these two straight lines represents such an aforementioned geometric center; and the cut-out portion (116) is located away from said geometric center.

In the embodiment shown in FIGS. 1 and 2, respectively, the cut-out portion (116) has a circular shape. Furthermore, the cut-out portion (116) comprises a beveled part (116*a*). Thereby, the area of the cut-out portion (116) located in the top surface (110) of the test strip fixation device is enlarged to some extent towards the bottom surface. The cavity thus formed, with the cut-out portion (116) at the center of said cavity, facilitates precise application of the sample of body fluid to a reagent test field of an optical test strip to be used together with the test strip fixation device.

The bottom surface (104) comprises a fixation element (also referred to herein as a "connector") for detachable connection of an optical test strip (not depicted in FIGS. 1 and 2) relative to said test strip fixation device. In this embodiment, the connector is arranged perpendicularly relative to the outer edges of one of the pairs of outer edges. In this arrangement, the optical test strip is to be connected to the test strip fixation device by inserting the optical test strip in the direction indicated by the arrow A in FIG. 1.

The connector may comprise one or more guiding elements (170, 172, 174) (also referred to as "guides"). In the embodiment shown, the connector comprises at least three guiding elements, specifically including a guide channel (170), an orifice (172), and an engagement hook (174). The guiding elements (170, 172, 174) together ensure proper positioning of the optical test strip (118) relative to the test strip fixation device. Particularly, the guide channel (170) is essentially U-shaped and serves to accommodate the optical test strip (118) when it is connected to the test strip fixation device, and is configured to guide the optical test strip (118) during insertion of the test strip into the guide channel (170). The orifice (172), which the optical test strip (118) is pushed through during insertion of the test strip into the guide channel (170), is configured to keep the test strip in place, specifically if the test strip fixation device is turned upside down or is otherwise turned around. Additionally, the engagement hook (174) is configured to securely fasten the optical test strip (118) to the test strip fixation device, as soon as a corresponding hole in said optical test strip (118) is aligned with the engagement hook (174), such that the test strip can be locked in place.

An optical test strip (118) to be used together with the test strip fixation device is adapted to be detachably connected to said test strip fixation device. Such an optical test strip (118) usually will comprise a carrier and a reagent test region (120) for application of the sample of body fluid. Said reagent test region (120) may be arranged on said carrier. Specifically, said carrier may have a transparent zone or a cut-out zone at the location of said reagent test region (120).

If an optical test strip (118), such as one as described herein above, is connected to the test strip fixation device, said optical test strip (118) usually will extend at least 5 mm beyond one of the outer edges (108), e.g., beyond the lower one of the outer edges (108) depicted in FIG. 1. Thereby, a robust and convenient user handling of the test strip fixation device and the optical test strip can be achieved.

Moreover, if the optical test strip (118) is connected to the test strip fixation device, the reagent test region (120) of the optical test strip (118) can be aligned with the cut-out portion (116) of the test strip fixation device. Generally, the cut-out portion (116) of the test strip fixation device has a size no smaller than the reagent test region (120) of an optical test strip (118) to be used together with the test strip fixation device. Specifically, the cut-out portion (116) has a size which, if the optical test strip (118) is connected to the fixation element (170, 172, 174) of the test strip fixation device, allows observation of at least a part of the carrier of the optical test strip (118), for example, a part of the carrier which is adjacent to the reagent test region (120).

Figure 3:
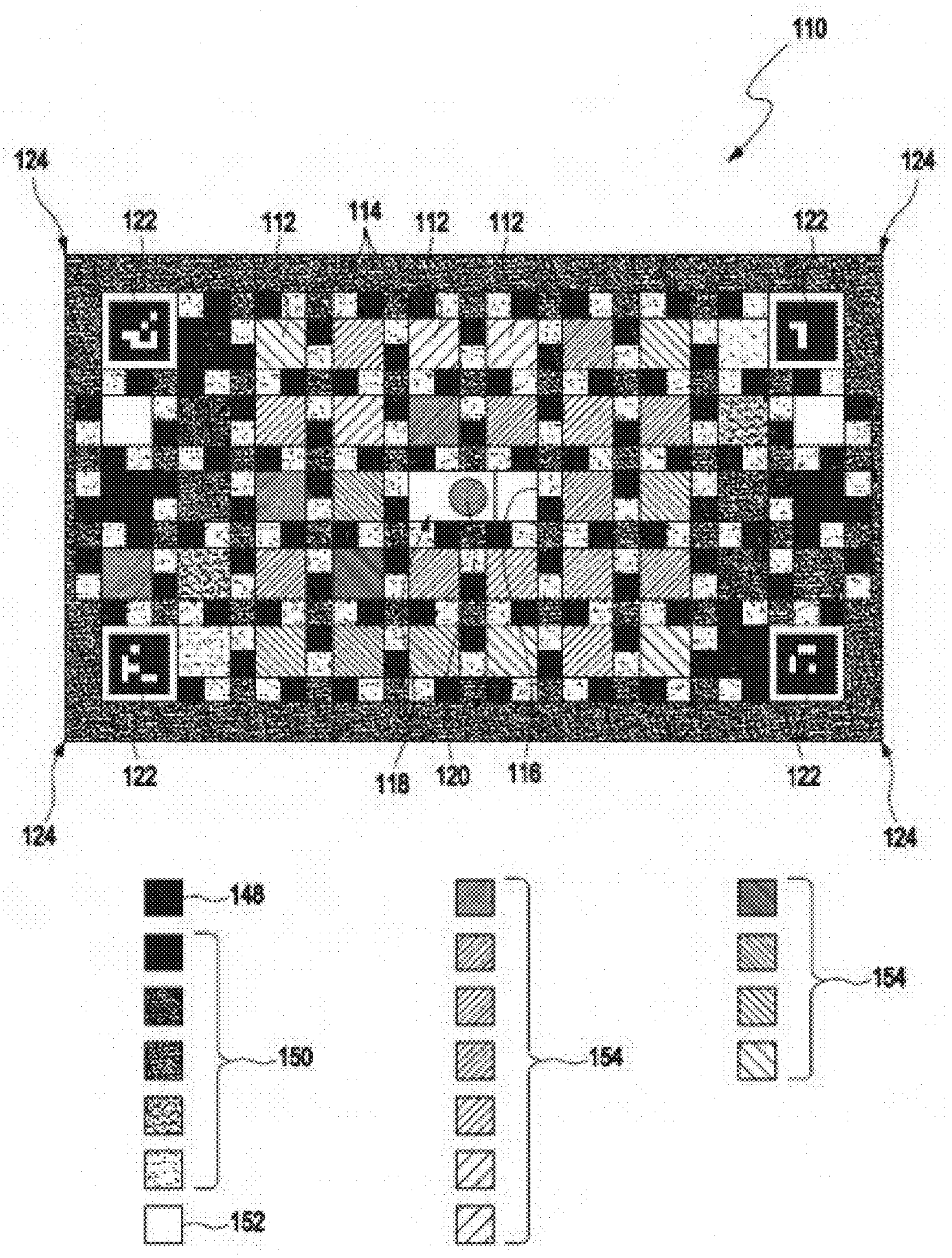
FIG. 3 shows a schematic view of the top surface of an exemplary embodiment of a test strip fixation device.

Referring to FIG. 3, the test strip fixation device comprises a top surface (110) comprising a plurality of color reference fields (112, 114, 148, 150, 152, 154) having known reference color values. The color reference fields include grey reference fields (114, 150) which are locally, and in this embodiment symmetrically, arranged around the cut-out portion (116) and around the non-grey color reference fields (112, 148, 152, 154).

Generally, the color reference fields (112, 114, 148, 150, 152, 154) may be distributed equally over the top surface (110), specifically in such a way that the plurality of color reference fields (112, 114, 148, 150, 152, 154) may be distributed over the entire top surface (110). As an example, the color reference fields (112, 114, 148, 150, 152, 154) may be arranged in a matrix pattern, such as a rectangular matrix pattern. However, the color reference fields (112, 114, 148, 150, 152, 154) may also be arranged in other ways, such as separately from each other. In the embodiment shown, the top surface (110) comprises a plurality of gray color reference fields (114, 150) surrounding the non-grey color reference fields (112, 148, 152, 154). The non-grey color reference fields (112, 148, 152, 154) and the gray color reference fields (114, 150) may not overlap each other.

In FIG. 3, the grey reference fields (114, 150) comprise more than three different grey shades. Specifically, the grey reference fields (114, 150) comprising the different grey shades are arranged locally around the cut-out portion. Additionally, the grey reference fields (114, 150) comprising the different grey shades are arranged locally around at least some of the non-grey color reference fields (112, 148, 152, 154).

Furthermore, top surface (110) comprises position detection code elements (122). In this embodiment, the position detection code elements (122) are located essentially at the outer edges (108) of the test strip fixation device. Additionally, and as an alternative to the embodiment shown, the position detection code elements (122) may be located on the top surface (110) such that they delimit the color reference fields (112, 114, 148, 150, 152, 154), specifically including the grey reference fields (114, 150), on the top surface (110).

The position detection code elements (122) may be or may, as an example, comprise at least one of a position marker, such as an ArUco code, a barcode, a QR-code, a label or a combination thereof. Specifically, the position detection code elements (122) may comprise one or more ArUco codes, such as in the corners of a rectangular matrix comprising the color reference fields (112, 114, 148, 150, 152, 154). Thus, generally, the position detection code elements (122) may be arranged in at least one corner (124) of the top surface (110). For example, at least one position detection code element (122) may be arranged in each of the corners (124) of the top surface (110), specifically in such a way that the position detection code elements (122) may be visible together with the plurality of color reference fields (112, 114, 148, 150, 152, 154).

The position detection code elements (122) used here comprise squared markers, and particularly ArUco markers. Furthermore, the position detection code elements (122) may comprise information specific to the test strip fixation device, said information comprising, for example, lot-specific information and/or calibration information relating to the color reference fields (112, 114, 148, 150, 152, 154). Further, the position detection code elements (122) may comprise information about the orientation of the top surface (110) of the test strip fixation device.

The top surface (110) and the bottom surface (104) including the fixation element may efficiently be formed as a one-piece injection molded part. The color reference fields (112, 114, 148, 150, 152, 154) and the position detection code elements (122) may be applied to the top surface (110) by a printing process. Alternatively, the color reference fields (112, 114, 148, 150, 152, 154) and the position detection code elements (122) may be printed onto a label which is applied to the top surface, e.g., by use of an adhesive, an adhesive tape, or the like. In an exemplary embodiment, the color reference fields (112, 114, 148, 150, 152, 154), including the gray color reference fields (114, 150), may be printed on a pre-printed gray-colored background of the top surface (110). Thus, the color reference fields (112, 114, 148, 150, 152, 154) may overlap with the gray-colored background of the top surface (110).

Figure 4:
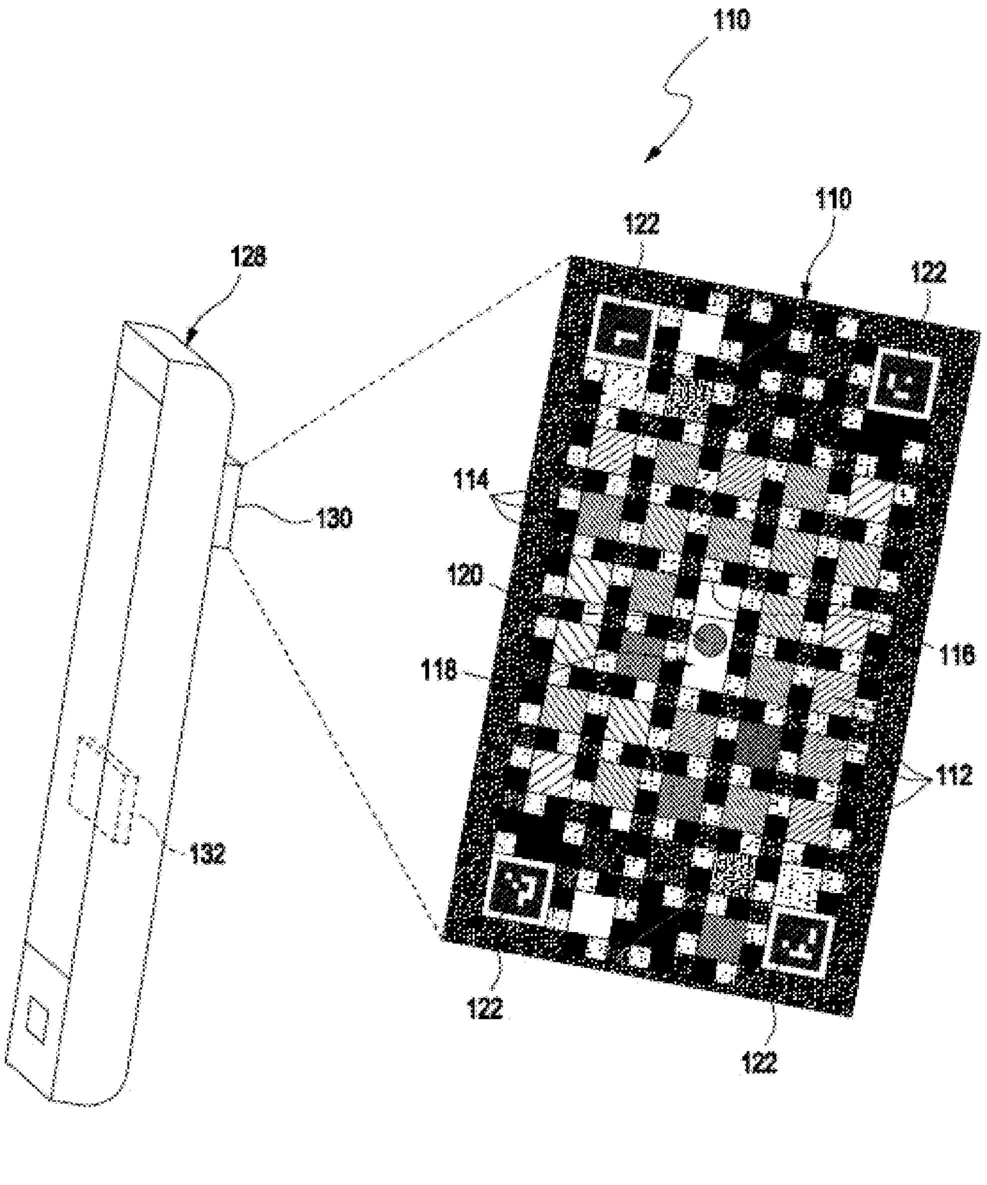
FIG. 4 shows a schematic view of a mobile device and an embodiment of a kit comprising a test strip fixation device and an optical test strip, in a perspective view.

In FIGS. 3 and 4, respectively, the top surface (110) comprises a cut-out portion (116) of a rectangular shape. Thus, an optical test strip (118) or at least a part thereof may be visible through the cut-out portion (116) if the optical test strip (118) is connected to the test strip fixation device, as is the case with regard to FIGS. 3 and 4. Specifically, a reagent test region (120) of the optical test strip (118) may be visible through the cut-out portion (116).

In FIG. 4, a schematic view of a mobile device and an exemplary embodiment of a kit comprising a test strip fixation device and an optical test strip to be used therewith, in a perspective view. The kit comprises at least one test strip fixation device and at least one optical test strip (118). Further, the kit may comprise at least one mobile device (128). The mobile device (128) may be, or may comprise, at least one of a cell phone, a smartphone, a tablet computer or the like. Further, the mobile device (128) has at least one camera (130). The camera (130) of the mobile device (128) may be configured for recording images (herein also referred to as "capturing images"), specifically color images. Thus, the camera (130) may be a color camera, and may comprise at least three color sensors, such as at least one color sensor for the R, G, B colors.

Figure 5:
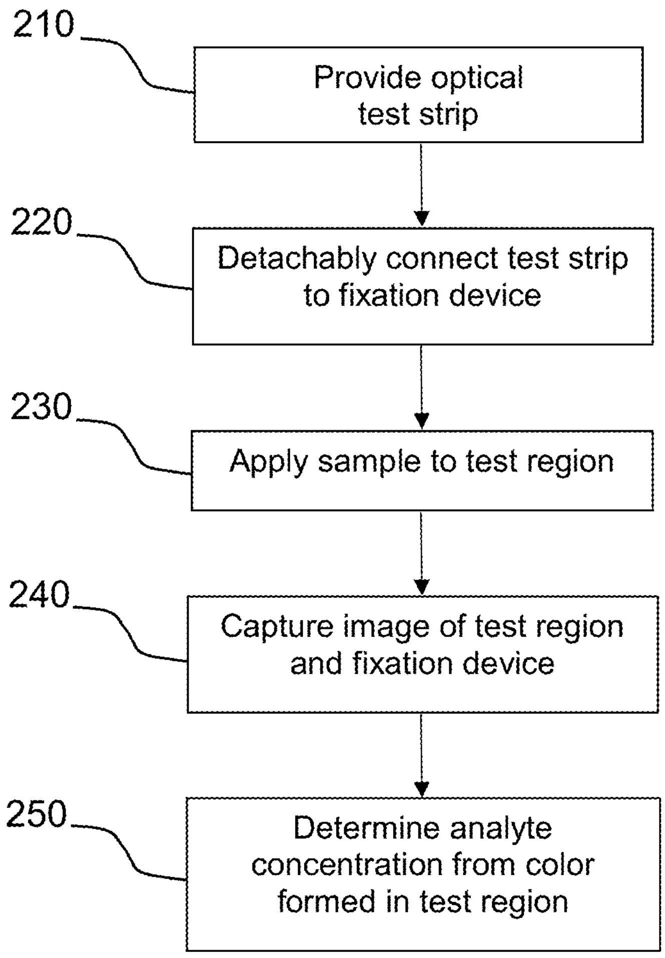
FIG. 5 shows a flow chart of an embodiment of a method for determining the concentration of at least one analyte in a body fluid.

Further, the mobile device (128) generally comprises at least one processor (132). The processor (132) may be configured, specifically by software programming, to perform one or more of the method steps of the method for determining the concentration of an analyte in a body fluid according to this disclosure. An exemplary embodiment of said method is shown in FIG. 5, and will be described in further detail below.

The processor (132) may specifically be configured for supporting the capturing of at least one image of the top surface (110) of the test strip fixation device. Specifically, the processor (132) may prompt a user of the mobile device (128) to capture the image. Additionally or alternatively, the processor (132) may be configured for automatically capturing the image of the top surface (110), specifically when the top surface (110) may be in a field of view.

The top surface (110) specifically may be embodied according to any one of the embodiments disclosed in connection with FIG. 3 as described in further detail above. The top surface (110) comprises the plurality of color reference fields (112, 114, 148, 150, 152, 154) having known reference color values. Further, the test strip fixation device comprises the at least one cut-out portion (116). Thus, the optical test strip (118) may be visible through the cut-out portion (116), specifically if the optical test strip (118) is connected to the test strip fixation device, such that both, the top surface (110) and the optical test strip (118), may be visible on the at least one image captured by the camera (130) of the mobile device (128). Specifically, the at least one reagent test region (120) of the optical test strip (118) may be visible through the cut-out portion (116), more specifically if looking from the direction of the top surface (110). In such an arrangement, the sample of body fluid is to be applied to the reagent test region (120) of the optical test strip (118) from the direction of the bottom surface. The color formed in the reagent test region (120) is then visible through the cut-out portion (116). Additionally or alternatively, the sample of body fluid may be applied to the optical test strip before it is connected to the test strip fixation device. Furthermore, additionally or alternatively, an optical test strip having a capillary for receiving the sample of body fluid and/or for transporting the sample of body fluid to the reagent test region (120) may be used together with the test strip fixation device.

The top surface (110) further comprises the at least one position detection code element (122). The position detection code elements (122) are arranged on the top surface (110) such that the position detection code elements (122) may be detectable by the camera (130) of the mobile device (128). The at least one position detection code element (122) may be used for identifying the orientation of the test strip fixation device and of the top surface (110) thereof, relative to the camera of the mobile device. Specifically, the processor (132) of the mobile device (128) may be configured for detecting the position detection code elements (122) on an image captured by the camera (130) and for further retrieving information about the orientation of the top surface (110).

In FIG. 5, a flow chart of an exemplary embodiment of a method for determining the concentration of at least one analyte in a body fluid is shown. The method comprises using at least one mobile device (128) having at least one camera (130). The method further comprises using at least one optical test strip (118) and the test strip fixation device as described herein above.

The method comprises the following steps, which specifically may be performed in the given order. Still, a different order may also be possible. It may be possible to perform two or more of the method steps fully or partially simultaneously. It may further be possible to perform one, more than one or even all of the method steps once or repeatedly. The method may comprise additional method steps that are not listed.

The method comprises:

(i) (denoted with reference number 210) providing the optical test strip (118), wherein said optical test strip (118) comprises a carrier and a reagent test region (120) being arranged on said carrier, wherein said carrier comprises a cut-out zone (or, alternatively, a transparent zone) at the location of said reagent test region (120);

(ii) (denoted with reference number 220) detachably connecting said optical test strip (118) to the test strip fixation device; specifically such that a sample application site of the reagent test region (118) faces away from the bottom surface (104) of the test strip fixation device;

(iii) (denoted with reference number 230) applying a sample of the body fluid to said reagent test region (120), whereby a color is formed in the reagent test region (120), which color can be observed from the direction of the top surface (110) through the cut-out portion (116) of the test strip fixation device and through the cut-out zone (or, alternatively, the transparent zone) of the carrier of the optical test strip (118);

(iv) (denoted with reference number 240) capturing by the camera (130) at least one image containing at least a part of the optical test strip (118) and at least a part of the top surface (110) of the test strip fixation device, wherein the image comprises at least a part of the reagent test region (120) having the sample of the body fluid applied thereto, wherein the image further comprises at least a part of the color reference fields, including at least a part of the grey reference fields; and (v) (denoted with reference number 250) determining the concentration of the analyte from the color formed in the reagent test region (120) upon application of the sample of the body fluid, taking into account at least some of the color reference fields, including the grey reference fields.

In step (iv), the capturing of the image of the reagent test region (120) may be performed by the processor (132), for example, by prompting the user to capture the image and/or by automatically capturing the image.

Further, the method may comprise an analytical measurement which comprises detecting a color value of the reagent test region (120) having the sample of the body fluid applied thereto and determining the analyte concentration based on the color formation reaction of the reagent test region (120). To this end, the method may further comprise determining measured reference color values for at least some of the color reference fields (112, 114, 148, 150, 152, 154), from the image; and determining a relationship between at least some of the measured reference color values and the corresponding known reference color values. Thereby, the relationship determined may be used to correct measured color values of the color formation reaction, in particular by using a color transformation matrix. The analyte concentration may be determined by using the corrected color values.

The method for determining the concentration of an analyte in a body fluid may at least partially be computer implemented, specifically steps (iv) and (v) of the method. The mobile device (128) may specifically be configured for executing the computer program, which when executed by the mobile device (128), cause the processor (132) of the mobile device (128) to perform steps (iv) and (v) of the method. The processor (132) may specifically be configured for capturing the at least one image of the reagent test region (120), such as by prompting the user to capture the at least one image and/or by automatically capturing the at least one image.

Further, the processor (132) may be configured, specifically by software programming, for determining the analyte concentration based on the color formation reaction of the reagent test region (120). The processor (132) may be configured for determining the analyte concentration by evaluating the captured image, deriving a change of one or more color coordinates, or any linear or non-linear combination thereof, taking place during the color formation reaction and transforming the change of the at least one color coordinate into the analyte concentration value. Specifically, the processor (132) may be configured for using a relationship between at least some of the measured reference color values and the corresponding known reference color values, for deriving a true color value from the captured image. Thus, the processor (132) may correct the measured color values of the captured image by transforming measured color values into true color values using a color transformation matrix determined from the relationship described herein above.

Specifically, the determining the concentration of the analyte in step (v) further may comprise taking into account local intensity variations in the at least one image captured in step (iv), wherein said local intensity variations may occur at the locations of one or more of the color reference fields, and wherein the grey reference fields are used to account for said local intensity variations.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS

104 bottom surface
104*a* beveled part of bottom surface
108 outer edge
110 top surface
112 color reference field
114 gray reference field
116 cut-out portion
116*a* beveled part of cut-out portion
118 optical test strip
120 reagent test region
122 position detection code element
124 corner
126 kit
128 mobile device
130 camera
132 processor
148 color reference field (black)
150 gray reference field
152 color reference field (white)
154 color reference field
160 central region of bottom surface
170 guide channel
172 orifice
174 engagement hook
210 providing an optical test strip
220 detachably connecting the optical test strip to a test strip fixation device
230 applying a sample of a body fluid to a reagent test region
240 capturing by a camera an image containing a part of the optical test strip and a part of the top surface of the test strip fixation device
250 determining the analyte concentration

What is claimed is:

1. A test strip fixation device for use in a method for determining concentration of an analyte in a body fluid using a mobile device with a camera, said test strip fixation device comprising:

a) a top surface and a bottom surface and having an essentially planar shape;
b) a cut-out portion;
c) the top surface comprising a plurality of color reference fields having known reference color values, including grey and non-grey reference fields, wherein the grey reference fields surround the cut-out portion and surround at least some of the non-grey color reference fields, the top surface further comprising position detection code elements; and
d) the bottom surface comprising a connector configured for detachable connection of an optical test strip to the test strip fixation device and for alignment of a reagent test region of the test strip with the cut-out portion.

2. The test strip fixation device according to claim 1, wherein:

the test strip fixation device comprises first and second pairs of outer edges arranged essentially parallel to one another; and the test strip fixation device has an essentially rectangular or trapezoid shape and the outer edges of the first pair are longer than the outer edges of the second pair.

3. The test strip fixation device according to claim 2, wherein:

the cut-out portion is located away from the first and second pairs of outer edges; and/or the cut-out portion is located in a central area of the test strip fixation device relative to the first and second pair of outer edges; and/or the cut-out portion is located away from a geometric center defined by the first and second pair of outer edges of the test strip fixation device.

4. The test strip fixation device according to claim 1, wherein:

the test strip fixation device has a height of no more than 10 mm, including the top surface, the bottom surface and the connector; and/or the bottom surface is, at least in part, beveled from at least one of the outer edges towards a central region of the test strip fixation device, the central region of the test strip fixation device provides a maximum height of the test strip fixation device, and the central region has a planar surface.

5. The test strip fixation device according to claim 1, wherein a planar surface of a central region of the test strip fixation device deviates from a parallel orientation relative to the top surface by an angle of 5° to 25°.

6. The test strip fixation device according to claim 1, wherein:

at least some of the position detection code elements are located essentially at the outer edges of the test strip fixation device; and/or wherein at least some of the position detection code elements are located such that they delimit the grey reference fields on the top surface.

7. The test strip fixation device according to claim 1, wherein:

the position detection code elements comprise ArUco markers; and/or the position detection code elements comprise information specific to the test strip fixation device, said information comprising at least lot-specific information and/or calibration information relating to the color reference fields.

8. The test strip fixation device according to claim 1, wherein the grey reference fields comprise at least three different grey shades arranged locally around the cut-out portion and/or around at least some of the non-grey color reference fields.

9. The test strip fixation device according to claim 1, wherein the connector comprises one or more guides.

10. The test strip fixation device according to claim 1, wherein the top surface and the bottom surface, including the connector, are formed as a one-piece injection molded part, wherein the color reference fields and the position detection code elements are applied to the top surface by a printing process, or wherein the color reference fields and the position detection code elements are printed onto a label which is applied to the top surface.

11. The test strip fixation device according to claim 1, further comprising the optical test strip which is adapted to be detachably connected to the connector, said optical test strip comprising a carrier and the reagent test region for application of the sample of body fluid, said reagent test region being arranged on said carrier and said carrier having a transparent zone or a cut-out zone at the location of said reagent test region.

12. The test strip fixation device according to claim 11, wherein the cut-out portion of the test strip fixation device has a size no smaller than the reagent test region.

13. The test strip fixation device according to claim 12, wherein the cut-out portion has a size which, when the optical test strip is connected to the connector, allows observation of a part of the carrier which is adjacent to the reagent test region.

14. The test strip fixation device according to claim 11, wherein:

the test strip fixation device comprises first and second pairs of outer edges arranged essentially parallel to one another;

the connector is arranged essentially perpendicularly relative to at least one of the outer edges of the first or second pair of outer edges; and the optical test strip when connected to connector extends at least 5 mm beyond said one of the outer edges.

15. The test strip fixation device according to claim 1, wherein the bottom surface is, at least in part, beveled from at least one of the outer edges towards a central region of the test strip fixation device, the central region of the test strip fixation device provides a maximum height of the test strip fixation device, and the central region has a planar surface.

16. The test strip fixation device according to claim 1, wherein:

the test strip fixation device comprises four outer edges that define outside borders of the test strip fixation device;

the cut-out portion is spaced inwardly from all four outer edges; and at least one of the color reference fields is positioned between each of the four outer edges and the cut-out portion.

* * * * *